(12) United States Patent
Yacoub

(10) Patent No.: US 10,344,702 B2
(45) Date of Patent: Jul. 9, 2019

(54) DIFFERENTIAL FUEL INJECTION

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1289 days.

(21) Appl. No.: 13/925,323

(22) Filed: Jun. 24, 2013

(65) Prior Publication Data

US 2014/0019028 A1   Jan. 16, 2014

(30) Foreign Application Priority Data

Jul. 16, 2012   (DE) .................. 10 2012 212 403

(51) Int. Cl.
| | |
|---|---|
| F02D 41/00 | (2006.01) |
| F02D 41/34 | (2006.01) |
| F02D 41/02 | (2006.01) |
| F02D 41/40 | (2006.01) |

(52) U.S. Cl.
CPC ......... *F02D 41/34* (2013.01); *F02D 41/0082* (2013.01); *F02D 41/025* (2013.01); *F02D 41/401* (2013.01); *F02D 2250/11* (2013.01); *Y02T 10/26* (2013.01); *Y02T 10/44* (2013.01)

(58) Field of Classification Search
CPC .... F02D 41/34; F02D 41/025; F02D 41/0082; F02D 41/401; F02D 2250/11; Y02T 10/26; Y02T 10/44
USPC ....................................................... 701/103
See application file for complete search history.

(56) References Cited

U.S. PATENT DOCUMENTS

| | | | | |
|---|---|---|---|---|
| 4,957,086 A | * | 9/1990 | Sasaki ................... | F02D 41/345 123/478 |
| 5,370,099 A | * | 12/1994 | Koelle .................... | F02P 7/035 123/643 |
| 5,770,796 A | * | 6/1998 | Sakamoto ............. | F02D 41/008 73/114.41 |

(Continued)

FOREIGN PATENT DOCUMENTS

| | | |
|---|---|---|
| CN | 1752421 A | 3/2006 |
| DE | 102006035820 A1 | 8/2007 |

(Continued)

OTHER PUBLICATIONS

Partial Translation of Office Action of Chinese Application 201310298039.1, dated Aug. 31, 2016, State Intellectual roperty Office of PRC, 10 pages.

*Primary Examiner* — David Hamaoui
(74) *Attorney, Agent, or Firm* — Julia Voutyras; McCoy Russell LLP

(57) ABSTRACT

A system and methods for operating four in-line cylinders with common rail injection is described that comprises operating a first cylinder group without a compression and power stroke injection, but with an exhaust stroke injection while operating a second cylinder group with at least a compression stroke injection. In this way, the unburned fuel injected during the exhaust stroke enriches the exhaust-gas flow and further allows heating of the exhaust aftertreatment system. In one example provided, the first cylinder group is further configured to operate in an exhaust heating mode while also operating in a power generating mode.

16 Claims, 8 Drawing Sheets

(56) References Cited

U.S. PATENT DOCUMENTS

| | | | | |
|---|---|---|---|---|
| 5,979,413 A * | 11/1999 | Ohnuma | ............... | F02D 41/009 123/406.58 |
| 6,182,632 B1 * | 2/2001 | Yanagihara | ............... | F02B 1/12 123/299 |
| 6,491,016 B1 | 12/2002 | Buratti | | |
| 6,584,951 B1 * | 7/2003 | Patel | ............... | F01L 9/02 123/198 F |
| 7,143,727 B1 * | 12/2006 | Winstead | ............... | F01L 9/04 123/198 F |
| 7,287,509 B1 | 10/2007 | Brehob | | |
| 7,464,690 B1 * | 12/2008 | Reitz | ............... | F02D 41/3035 123/299 |
| 7,870,723 B2 * | 1/2011 | Elwart | ............... | F01N 13/009 60/274 |
| 8,151,559 B2 * | 4/2012 | Okugawa | ............... | F02D 41/029 60/285 |
| 8,831,858 B2 * | 9/2014 | Roth | ............... | F02D 41/008 123/568.12 |
| 9,394,834 B2 * | 7/2016 | Yacoub | ............... | F02D 17/02 |
| 2004/0065747 A1 * | 4/2004 | Petrone | ............... | F02D 41/34 239/5 |
| 2006/0168945 A1 * | 8/2006 | Samad | ............... | F02D 41/0087 60/285 |
| 2009/0088945 A1 * | 4/2009 | Yi | ............... | F02D 41/401 701/103 |
| 2009/0234559 A1 * | 9/2009 | Jung | ............... | F02D 35/02 701/103 |
| 2009/0282812 A1 | 11/2009 | Hu | | |
| 2010/0100304 A1 * | 4/2010 | Yasui | ............... | F02D 41/008 701/104 |
| 2010/0258088 A1 * | 10/2010 | Harrison | ............... | F02D 41/0097 123/478 |
| 2011/0023824 A1 * | 2/2011 | Asai | ............... | F01N 3/106 123/403 |
| 2011/0107740 A1 * | 5/2011 | Elwart | ............... | F01N 13/009 60/273 |
| 2011/0131957 A1 * | 6/2011 | Hepburn | ............... | F01N 3/021 60/278 |
| 2011/0184629 A1 * | 7/2011 | Krengel | ............... | F02D 19/061 701/103 |
| 2012/0144802 A1 * | 6/2012 | Driscoll | ............... | F01N 3/0253 60/274 |
| 2014/0019028 A1 * | 1/2014 | Yacoub | ............... | F02D 41/0082 701/103 |

FOREIGN PATENT DOCUMENTS

| | | |
|---|---|---|
| DE | 102011113925 A1 | 3/2013 |
| EP | 0878609 B1 | 3/2002 |
| EP | 0974746 B1 | 12/2004 |

* cited by examiner

DIFFERENTIAL FUEL INJECTION

CROSS REFERENCE TO RELATED APPLICATIONS

The present application claims priority to German Patent Application No. 102012212403.9, filed on Jul. 16, 2012, the entire contents of which are hereby incorporated by reference for all purposes.

FIELD

The present description relates to a method and device for controlling engine injection during the engine drive cycle.

BACKGROUND AND SUMMARY

Exhaust systems of internal combustion engines may include an exhaust-gas aftertreatment device comprising one or more catalytic converters, for example an oxidation catalytic converter. In order to function optimally, such exhaust-gas aftertreatment devices may, at least intermittently, function with an exhaust-gas temperature higher than that attained during normal engine operations. In one particular example, the exhaust temperature is increased by means of an exothermic reaction of unburned fuel contained within the exhaust-gas flow on an oxidation catalytic converter element.

It is known for the exhaust-gas flow to be enriched with fuel directly injected into an engine cylinder by means of a post-injection, which takes place after the combustion process. However, problems arise since some of the fuel injected may pass into and thin the engine oil that is used for lubricating the engine. Thereby, the lubricating action of the engine oil is diminished over time. Alternatively, the exhaust-gas flow may be enriched with fuel injected directly into the exhaust tract of the engine. For this purpose, an injection nozzle is provided for injecting the fuel at a relatively low pressure (e.g., 5 to 10 bar) directly into the exhaust-gas flow. In one example, the fuel injected may be sprayed onto a heating element that further assists with the fuel evaporation process before introduction into the exhaust-gas flow. However, adding an injection system of such design to a vehicle increases both the vehicle complexity and its overall cost. In another example, US 2011/0107740 A1 describes an internal combustion engine with direct injection means, wherein the exhaust system of the engine has a fuel cell such that a first cylinder is operated in lean-burn mode to deactivate the fuel injection and a second cylinder is operated with a rich mixture.

Herein, the inventors have recognized issues with the approaches above and describe methods for operating a first cylinder group without a compression and power stroke injection, but with an exhaust stroke injection while operating a second cylinder group with at least a compression stroke injection, where each of the exhaust stroke injection and compression stroke injection are greater than a threshold. Thereby, the system and methods may inject fuel to one or more cylinders during an exhaust stroke to heat the exhaust system while also injecting fuel during one or more compression strokes to power the vehicle drivetrain during the engine drive cycle. The methods according to the present disclosure therefore provide an alternative method and device for controlling the internal combustion engine in order to enrich the exhaust-gas flow with fuel. In one example provided, a four-stroke in-line applied-ignition engine operated in accordance with the present disclosure delivers a main injection of the fuel injection process into one or more cylinders during an exhaust stroke of the engine drive cycle. As such, no main injection occurs during a compression stroke of the cylinder since said main injection instead takes place during the exhaust stroke. Further, because the main injection takes place during the exhaust stroke, the amount of fuel supplied to the cylinder during said main injection is not necessarily available for generating power during the working stroke, which is referred to herein as the power (or expansion) stroke. In this sense, fuel injection within a cylinder is reduced and the cylinder is deactivated.

By virtue of the fact that the main injection takes place during the exhaust stroke of a cylinder, the mixture of fuel and air produced therein thus allows the exhaust-gas flow to be enriched with unburned fuel in a particularly simple and effective manner. Therefore, the exhaust-gas temperature at an oxidation catalytic converter element can be increased while the operation of the exhaust-gas aftertreatment device is enhanced. In particular, an additional injection system for injecting fuel into the exhaust system is not required, which reduces the overall cost and complexity of the engine system described herein. In addition, because one or more cylinders are sometimes operated with no main injection during a compression stroke, intake stroke or expansion stroke, enriching the exhaust-gas flow with fuel is particularly expedient since the fuel-air mixture is discharged into the exhaust tract. In this way, a fuel injection system can be designed to produce an adequate amount of fuel while also controlling the fuel injection with adequate precision.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
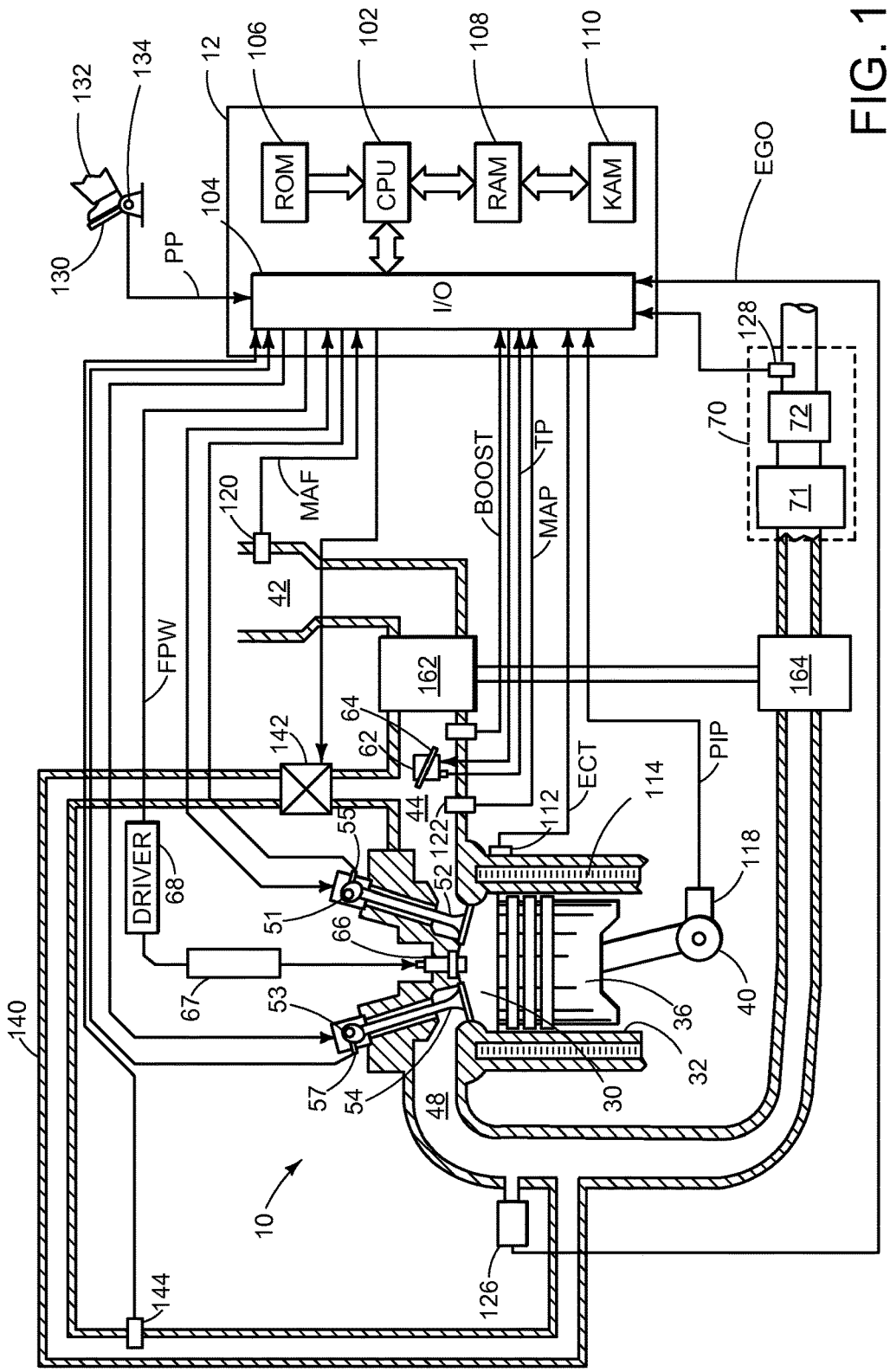
FIG. 1 shows a schematic diagram of an engine.
Figure 6:
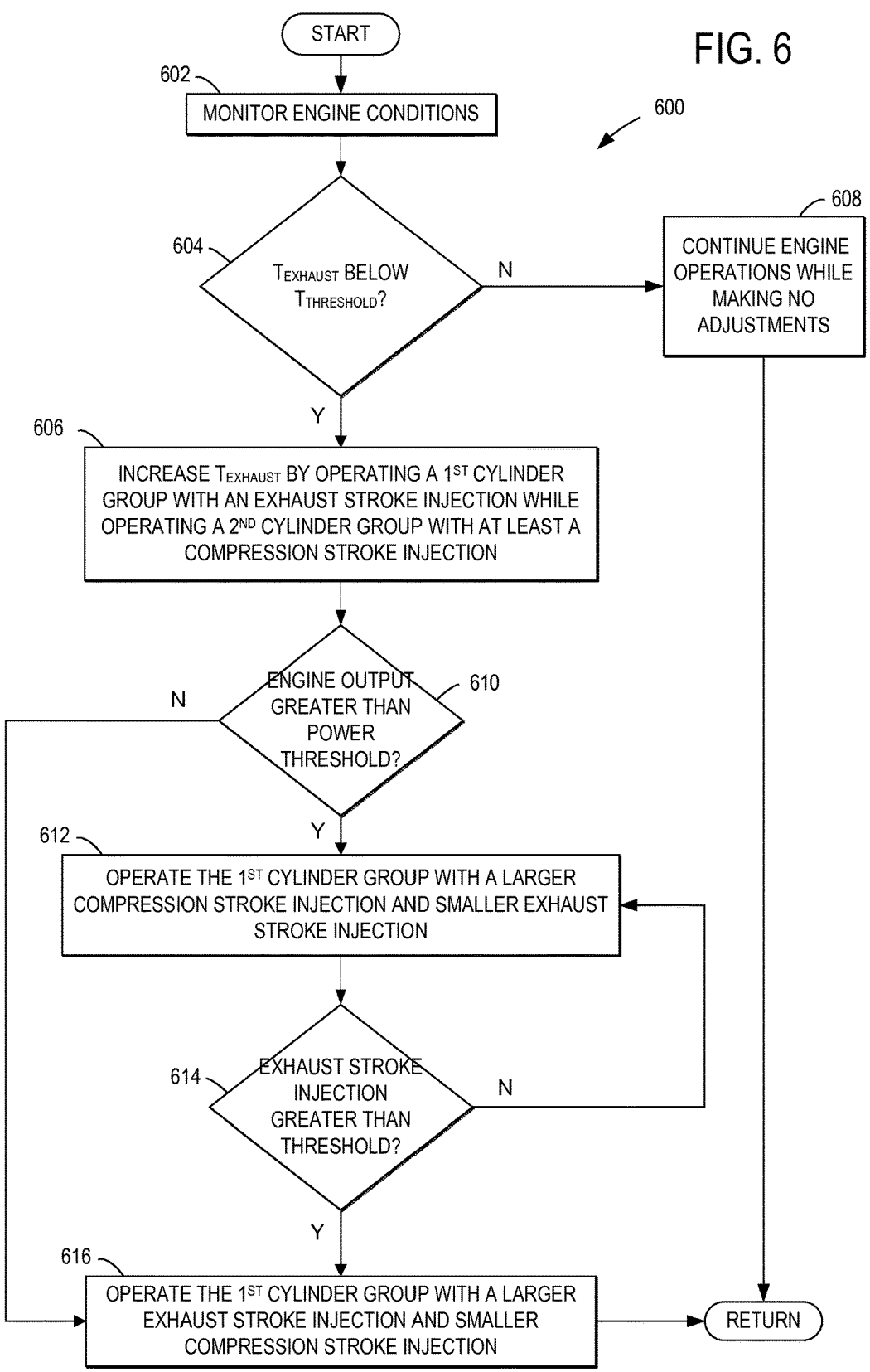
FIG. 6 is an example flow chart for making fuel injection adjustments based on the engine operating conditions.
Figure 7:
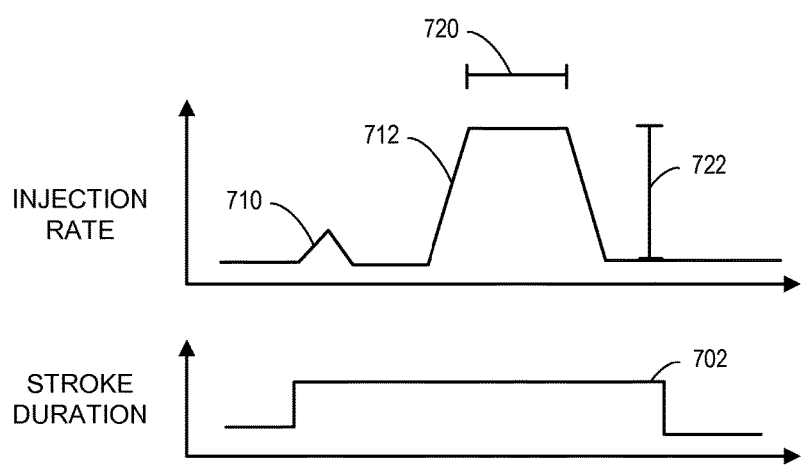
FIG. 7 shows an example cylinder injection profile.
Figure 8:
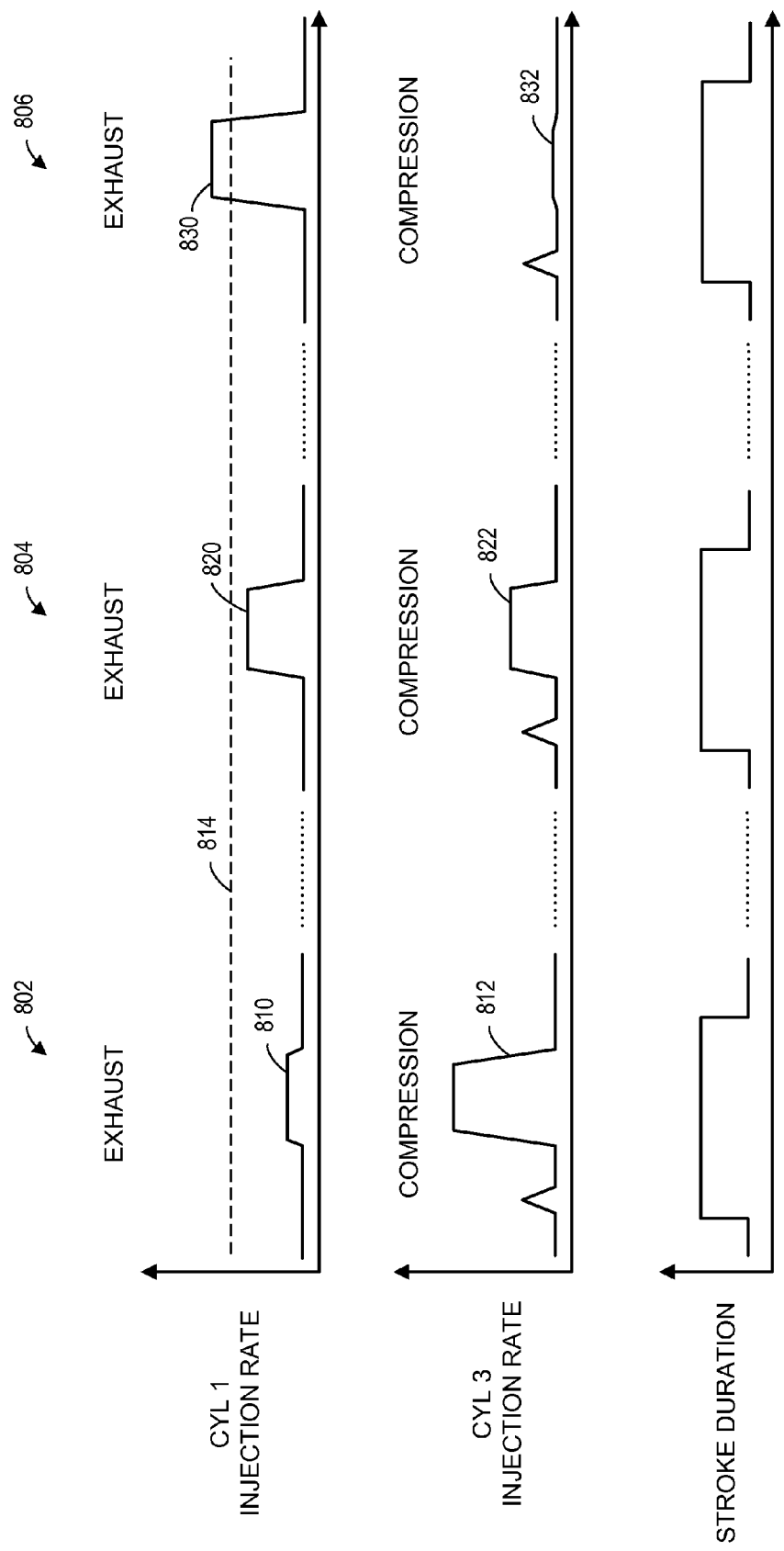
FIG. 8 shows an example injection profile for two cylinders to illustrate how fuel delivery is adjusted based on an exhaust stroke injection.

The engine system herein adjusts a fuel delivery for an exhaust stroke injection within one or more cylinders while also generating power therein. For simplicity, to demonstrate the methods a four-cylinder in-line internal combustion engine operating via a four-stroke cycle is described. The methods include partially deactivating a first cylinder group (e.g., the odd-numbered cylinders, as described herein) by operating the first cylinder group without a compression and power stroke injection, but with an exhaust stroke injection while operating a second cylinder group (e.g., the even-numbered cylinders) with at least a compression stroke injection to generate power therein. FIG. 1 shows a schematic diagram of an example engine cylinder to illustrate various features of the engine system described. Then, FIGS. 2-5 show maps of valve timing and injection profiles for the engine system during normal operations and various embodiments according to the present disclosure. Because the engine system makes adjustments based on the engine operating conditions, FIG. 6 shows an example flow chart for adjusting one or more fuel injections based on the exhaust temperature and engine output. FIGS. 7 and 8 further show example schematic diagrams to illustrate how a fuel injection may be adjusted during an engine stroke so the partially deactivated cylinders generate exhaust heat and power based on the engine operating conditions.

Turning to the engine system, FIG. 1 shows a schematic diagram of one cylinder of multi-cylinder engine 10, which may be included in a propulsion system of an automobile. Engine 10 may be controlled at least partially by a control system including controller 12 and by input from a vehicle operator 132 via an input device 130. In the example shown, input device 130 includes an accelerator pedal and a pedal position sensor 134 for generating a proportional pedal position signal PP. Combustion chamber 30, also referred to as an engine cylinder, of engine 10 may include combustion chamber walls 32 with piston 36 located therein. Piston 36 may be coupled to crankshaft 40 so the reciprocating motion of the piston is translated into rotational motion of the crankshaft. Crankshaft 40 may be coupled to at least one drive wheel of a vehicle via an intermediate transmission system. Furthermore, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the intake and exhaust valves, respectively. The position of intake valve 52 and exhaust valve 54 may be further determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein. Fuel injection may be via a common rail system 67, or other such diesel fuel injection system. In some embodiments, fuel may be delivered to fuel injector 66 by a high pressure fuel system (not shown) including a fuel tank, a fuel pump, and a fuel rail. As described in detail below, according to the present disclosure controller 12 may vary signals provided to fuel injector 66 and thereby adjust a fuel injection timing within one or more cylinders during the engine drive cycle. For example, when an exhaust temperature is low (e.g., below a threshold), fuel injection to one or more cylinders may occur during an exhaust stroke that acts to enrich the exhaust-gas flow so unburned fuel is distributed to the exhaust system that increases the temperature via an exothermic reaction of the unburned fuel on an oxidation catalytic converter element. In this way, the engine system may operate in an exhaust heating mode simply by adjusting a fuel injection during the engine drive cycle.

Intake passage 42 may include a throttle 62 having a throttle plate 64. In this particular example, the position of throttle plate 64 may be varied by controller 12 via a signal provided to an electric motor or actuator included within throttle 62, a configuration that is commonly referred to as electronic throttle control (ETC). In this manner, throttle 62 may be operated to vary the intake air provided to combustion chamber 30, among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within EGR passage 140 that provides an indication of one or more of pressure, temperature, and concentration of the exhaust gas. Alternatively, the EGR system may be controlled through calculations based on signals from the MAF sensor (upstream), MAP (intake manifold), MAT (manifold gas temperature) and the crank speed sensor. Further, the EGR may be controlled based on an exhaust $O_2$ sensor and/or an intake $O_2$ sensor. Under some conditions, the EGR system may be used to regulate the temperature of air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and therefore may not include a turbine.

Thus, the amount of compression provided to one or more cylinders of the engine via a turbocharger or supercharger may be varied by controller 12. In a four-stroke four-cylinder applied-ignition internal combustion engine, during a first stroke, air or an ignitable mixture of fuel and air may be inducted into combustion chamber 36. Alternatively, in the case of an engine equipped with a turbocharger or a supercharger, the combustion chamber may be filled with air or with the fuel-air mixture. When an exhaust-gas recirculation is present (e.g., exhaust passage 148), the air supplied may also contain an exhaust-gas fraction.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Additionally and/or alternatively, exhaust gas sensor 126 may be a temperature sensor for measuring an exhaust gas temperature within exhaust passage 148.

Emission control system 70 is shown arranged along exhaust passage 48 downstream of exhaust gas sensor 126. System 70 may be a selective catalytic reduction (SCR) system, three way catalyst (TWC), NOx trap, various other emission control devices, or combinations thereof. For example, system 70 may be an SCR system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). Emission control system 70 may further include exhaust gas sensor 128. Sensor 128 may be any suitable sensor for providing an indication of a concentration of exhaust gas constituents such as a $NO_x$, $NH_3$, or EGO sensor, for example. Further, in some embodiments, during operation of engine 10, emission control system 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc. Although a four-stroke internal combustion engine is described with four cylinders that is operated or controlled in accordance with the methods herein, the methods may be generally useful for any engine having at least one cylinder and a fuel direct injection means, particularly if the engine is an applied-ignition engine.

Figure 2:
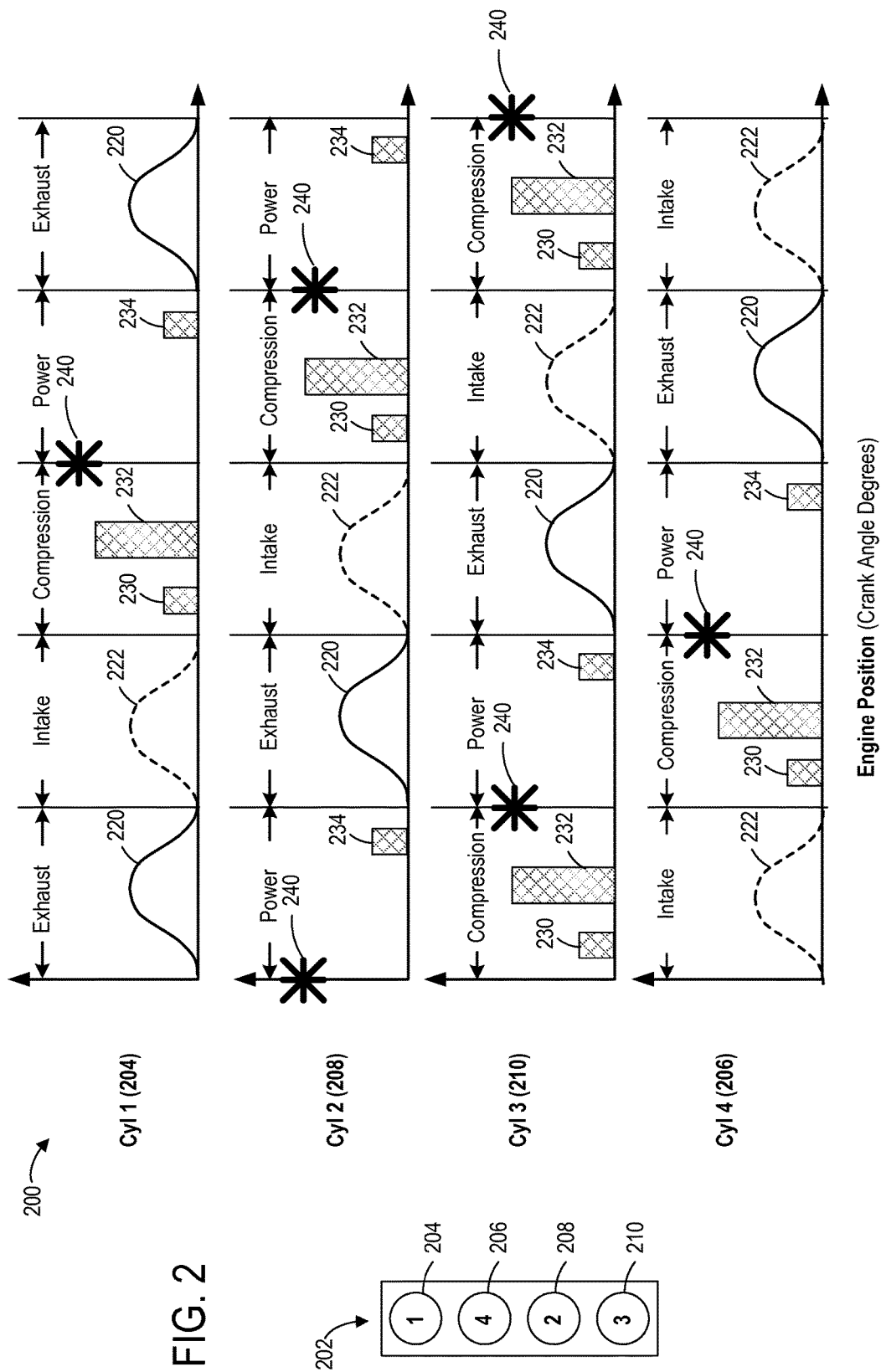
FIG. 2 shows an example map of valve timing and piston position with respect to fuel injection during normal operation.

In FIG. 2, an example map 200 of valve timing and piston position is shown along with fuel injection during normal engine operation for reference. Example map 200 shows example valve timing and piston position with respect to engine position (or crank angle degrees) within the four strokes (intake, compression, power, and exhaust) for the four-cylinder in-line engine 202 having a firing order of 1-2-3-4 (or 204, 208, 210, 206, respectively).

In a four-cylinder engine, the individual strokes and piston movements are offset from one cylinder to the next. The chronological sequence of the four strokes is illustrated in FIG. 2. Herein, the chronological sequence of the individual strokes of the second cylinder (cylinder 2) is offset in relation to that of the first cylinder (cylinder 1) such that the intake stroke of the second cylinder takes place during the compression stroke of the first cylinder. Likewise, the intake stroke of cylinder 3 takes place during the compression stroke of cylinder 2, the intake stroke of cylinder 4 takes place during the compression stroke of cylinder 3, and the intake stroke of cylinder 1 takes place during the compression stroke of cylinder 4. In this way, each of the strokes are offset with respect to one another such that one cylinder operates in the power stroke and thereby performs work to drive the other cylinders and the drivetrain. In FIG. 2, cylinders 1 to 4 are presented in the 1-2-3-4 ignition sequence. However, in other embodiments not shown, the geometric arrangement of the cylinders may be different.

During operation, piston 36 gradually moves downward from top-dead-center (TDC), bottoming out at bottom-dead-center (BDC) by the end of the intake stroke. The piston then returns to the top, at TDC, by the end of the compression stroke and then again moves back down, towards BDC, during the power stroke, before returning to its original top position at TDC by the end of the exhaust stroke. Curves 220 and 222 depict valve lift profiles during normal engine operation for exhaust and intake valves, respectively. Exhaust valve 220 may be opened just as the piston bottoms out at the end of the power stroke. The exhaust valve may then close as the piston completes the exhaust stroke, and remain open at least until a subsequent intake stroke of the following cycle has commenced. In a similar manner, intake valve 222 may be opened at or before the start of an intake stroke, and remain open until a subsequent compression stroke has commenced.

During normal operation like that shown in FIG. 2, each cylinder is utilized for power generation and is thus not deactivated in the manner described in detail below. Furthermore, as described herein, fuel injection is broken down into a pre-injection (or pilot injection), a main injection and a post-injection; and in some embodiments, the main injection may be further divided into a plurality of partial injections. Although a pre-, main-, and post-injection process is described herein, this is non-limiting, and in some embodiments, fewer fuel injections may take place (e.g., a main injection). During the intake stroke, the inlet valve of each cylinder is open and the outlet valve is closed. Therefore, an injection of fuel does not take place. During the compression stroke that further includes multiple injections comprising a pre-injection below the threshold and a main-injection, both valves are closed, and the pre-injection and main injections take place. During the power stroke, both valves remain closed and a post-injection may take place and provide additional power during the engine drive cycle. Finally, in the exhaust stroke, the inlet valve remains closed while the outlet valve is opened in order to discharge the exhaust gas into the exhaust tract of the internal combustion engine. During normal engine operations, a fuel injection does not take place during the exhaust stroke. As described herein, the normal operating mode is referred to as a third mode, wherein all four in-line cylinders operate with a compression stroke and no exhaust stroke injection. In some instances, the compression stroke injection in the third mode (e.g., the fifth compression stroke injection) may be different than the compression stroke injections (e.g., the first through fourth compression stroke injections) during the other engine operating modes described below.

Based on the description above, FIG. 2 further shows that normal engine operation includes operating the cylinders with main injection 232 (e.g., second compression stroke injection) occurring during the compression stroke of a cylinder. Therefore, during the normal operating mode, each cylinder includes a main injection 232. Furthermore, the injection process may comprise partial injections in addition to the main injection, wherein the fuel amount supplied during the one or more partial injections is considerably smaller than that supplied during the main injection. For example, in some instances, the main injection may be greater than a threshold that represents 50% of maximum fuel injection. As such, the partial injections fall below the threshold and therefore deliver a smaller amount of fuel than the main injection. As described herein, the normal operating mode includes performing pre-injection 230, main injection 232 and post-injection 234 within the engine cylinders during each stroke of the engine. For simplicity, the individual injections to the various cylinders are non-overlapping, and there remains sufficient time for the opening and closing of the injection valves, and for the supply of highly pressurized fuel to the injection valves. As noted above, during the compression stroke which follows the intake stroke, the inducted air-fuel mixture or the inducted air is compressed by an upward movement of the piston. In the case of an applied-ignition engine, ignition event 240 is performed by means of an ignition spark when the piston is in the vicinity of TDC. The ignited mixture forces the piston downward during the power stroke. During this stroke, work is done that generates power in the engine. Subsequently, the exhaust stroke follows the power stroke, and serves to discharge the burned mixture into the exhaust system by an upward movement of the piston. Thereby, each cylinder generates power during the power stroke of the cylinder so the normal operating mode is also be referred to as an engine powering mode.

Figure 3:
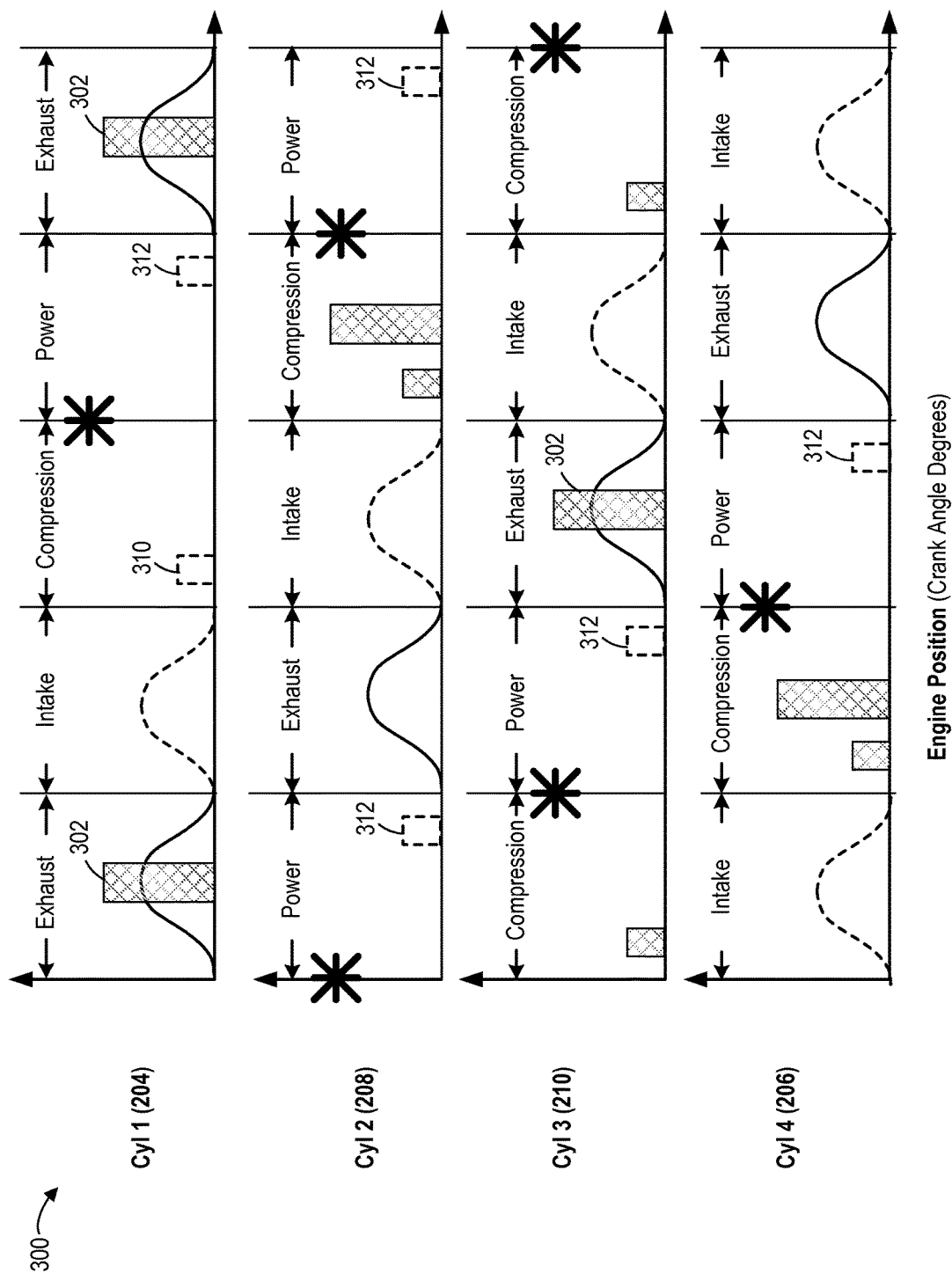
FIG. 3 shows an example map of valve timing and piston position with respect to fuel injection for an exemplary first embodiment according to the present disclosure.

With regard to the method according to the present disclosure for operating four in-line cylinders with common rail injection, FIG. 3 shows example map 300 of valve timing and piston position with respect to fuel injection for an exemplary first embodiment representing a first operating mode. FIG. 3 herein references FIG. 2 to illustrate how the engine operates the first cylinder group with a first compression stroke injection and a first exhaust stroke injection while operating the second cylinder group with at least a second compression stroke injection that may be different than the first compression stroke injection. As such, fuel may be injected during an exhaust stroke in order to heat an exhaust gas aftertreatment device while also substantially minimizing intervention into the operation and power generation of the engine system. Furthermore, although not shown, each of the exhaust stroke injection and compression stroke injection shown are greater than a threshold representing 50% of maximum fuel injection.

In the first embodiment, main injection 302 of the fuel injection process occurs during an exhaust stroke within a first cylinder group, which for simplicity includes the odd-numbered cylinders (e.g., cylinders 1 and 3). However, in other embodiments, the method may generally include one or more engine cylinders. Furthermore, in the first embodiment, no main injection takes place during the compression stroke (e.g., a first compression stroke injection) within the first cylinder group because the main injection instead takes place during the exhaust stroke. For example, FIG. 3 shows main injection 302 within cylinder 1 and cylinder 3 taking place during the exhaust stroke of each cylinder, respectively. In the example provided, the injection of fuel into each of the cylinders takes place during a time period that is short relative to the duration of the exhaust stroke, that is to say, in relation to the duration of upward movement of the piston during the exhaust stroke. Furthermore, during the exhaust stroke, an outlet valve is open for substantially the entire duration of the stroke. Therefore, in some embodiments, the main injection encompasses the predominant part of the total fuel amount or fuel mass introduced into the combustion chamber of the cylinder by the injection process. Although a first cylinder group (e.g., cylinders 1 and 3) injects fuel during the exhaust stroke, the second cylinder group (e.g., the even-numbered cylinders 2 and 4) has a main injection during their respective compression strokes and thereby operates with a compression stroke injection. Therefore, the second cylinder group is operated for power generation during the engine drive cycle as described above with respect to the normal operating mode shown in FIG. 2.

As noted above, the injection process further comprises partial injections. However, the fuel amount supplied during the one or more partial injections is considerably smaller than that supplied during the main injection (e.g., falls below 50% of maximum fuel injection). In FIGS. 2-5, the reduced fuel amount is denoted by smaller injection profiles. Furthermore, in the first embodiment, since the main injection takes place during the exhaust stroke, the fuel amount supplied to the cylinder during said main injection is not available for power generation during the work generating stroke. In this sense, the fuel injection of the cylinder is deactivated. By virtue of the fact that main injection 302 takes place during the exhaust stroke, the mixture of fuel and air produced in the combustion chamber of the cylinder can pass directly into the exhaust tract. In particular, the upward movement of the piston within the cylinder acts to reduce the volume of the combustion chamber, which causes the fuel-air mixture to be forced into the exhaust tract of the engine. For example, with respect to FIG. 1, said mixture may pass into exhaust passage 48 and further into emission control device 70. In this way, an enrichment of the exhaust-gas flow with unburned fuel is attained in a particularly simple and effective manner, whereby enhanced operation of an exhaust-gas aftertreatment device and/or an increase in the exhaust-gas temperature at an oxidation catalytic converter element is also attained. In addition, by virtue of the fact that no main injection takes place during the compression stroke, intake stroke, and/or power strokes, it is possible to enrich the exhaust-gas flow with fuel for discharge into the exhaust tract in a particularly expedient manner.

With regard to the injection process within the first embodiment, a fuel pre-injection 310 and/or fuel post-injection 312 into the combustion chamber of one or more cylinders may optionally occur during a compression stroke and expansion stroke of the cylinders, respectively. In this way, the operation of engine 10, and of the exhaust system is further enhanced. In particular, it is possible to obtain an optimum composition and temperature of the fuel-air mixture for the enrichment of the exhaust-gas flow with fuel. Although pre-injection 310 may optionally occur in some cylinders (e.g., in cylinder 1), in other cylinders (e.g., cylinder 3), pre-injection may occur as described above with respect to FIG. 2. For simplicity, such pre-injections are unaltered compared to the normal operating mode and so are not re-labeled in FIG. 3. In a like manner, fuel post-injection 312 may optionally occur in some engine cylinders based on one or more engine conditions.

In some instances, it may be advantageous that, at any point in time, non-overlapping injections are delivered to one cylinder at a time. In particular, in the case of an internal combustion engine with four in-line cylinders, the sequence of strokes in the individual cylinders may be such that, during the exhaust strokes of the first and third cylinders, respectively, the second and the fourth cylinders are in strokes wherein no main injection takes place (e.g., as described in the normal mode of FIG. 2). Therefore, if a pre-injection takes place during a compression stroke of the first or third cylinder, no pre-injection takes place in strokes, which are simultaneous with said strokes, of the other engine cylinders. Furthermore, if a post-injection takes place during a power stroke of the first or third cylinder, no post-injection takes place in an engine stroke simultaneous therewith. Therefore, during every stroke, a pre-injection, main injection and post-injection takes place in at most one cylinder and the individual injections to the various cylinders are non-overlapping. The operation in particular of a fuel direct injection device designed as a common rail system can be improved in this way.

As described herein, the exhaust stroke injections occur based on an exhaust temperature that falls below a threshold. Therefore, it is further possible for the main injection into the combustion chamber during the exhaust stroke to take place for a number of exhaust strokes based on a sensor signal (e.g., exhaust gas sensor 126). In particular, it may be provided that a main injection during an exhaust stroke, or main injections in each of a plurality of successive exhaust strokes are triggered in response to exhaust gas sensor 126 on the basis of a temperature signal that indicates an exhaust-gas temperature below the temperature threshold. Although not described in detail herein, the temperature threshold may be set to indicate an optimum operation of the exhaust-gas aftertreatment device based on the engine operating conditions. As such, the exhaust stroke injections may also occur more generally based on one or more engine operating conditions. For example, when an exhaust gas temperature falls below the temperature threshold, controller 12 may adjust the amount of fuel injected by fuel injector 66. In addition, operation of the second cylinder group with a compression stroke injection, that is to say normal operation, may also be provided. Thereby, differential fuel injection occurs that ensures optimum operation of the exhaust-gas aftertreatment device of the internal combustion engine is made possible. Furthermore, according to the methods described herein, the least possible intervention is made into the operation and power generation of the internal combustion engine. In this way, controller 12 ensures that the injection system provides an adequate amount of fuel while controlling the injection with adequate precision.

Generally, engine 10 may comprise an even number of cylinders (e.g., at least four) such that in each odd-numbered cylinder, an exhaust stroke injection takes place only during the exhaust stroke while each even-numbered cylinder operates with a compression stroke injection. However, this particular arrangement is done for simplicity of description herein and other configurations are possible. As described herein, the odd-numbered cylinders are substantially utilized for enriching the exhaust-gas flow with fuel and not for power generation, whereas the even-numbered cylinders are operated in the normal mode and so generate the mechanical power for driving the drivetrain. In this way, a particularly efficient enrichment of the exhaust-gas flow with fuel is attained. Furthermore, such operation of the odd-numbered cylinders for enriching the exhaust-gas flow with fuel may take place for a number of strokes or for a time period that depends on the enrichment of the exhaust gas required for the operation of the exhaust-gas aftertreatment device. Accordingly, the engine adjustments may further be made based on the power demand or load of the internal combustion engine (e.g., engine output).

Thereby, the device according to the present disclosure for controlling the four-stroke internal combustion engine described may have at least one first cylinder comprising a fuel direct injection device for directly injecting fuel into a combustion chamber of the cylinder and an electronic control unit (e.g., controller 12) designed to control the fuel direct injection device such that a main injection of fuel into the combustion chamber of a cylinder takes place only during an exhaust stroke of the first cylinder. As described herein, the internal combustion engine may further comprise at least a second cylinder operated in the normal mode, which is thus utilized for power generation while the first cylinder does not substantially contribute to generating power during the engine drive cycle. For simplicity, in the first embodiment, the fuel direct injection device is in this case designed for normal operation of the even-numbered cylinders and operation of the odd-numbered cylinders in an exhaust heating mode. Furthermore, in the case of an applied-ignition engine, it may be provided that no ignition event takes place in one or more cylinders comprising the first cylinder group, for example, the odd-numbered cylinders. As such, the device according to the present disclosure is in particular designed for carrying out the above-described method for controlling an internal combustion engine.

With respect to valve control, in the first embodiment, the valves may be controlled relative to the normal operations described in FIG. 2. However, no main injection of fuel into the combustion chamber of the cylinder takes place during the compression stroke, but a pre-injection may take place if appropriate. Instead, the main injection takes place during the exhaust stroke. Here, it is for example possible for the injection time, duration and amount to be adapted to the requirements for the enrichment of the exhaust-gas flow with fuel. If appropriate based on the engine operating conditions, a post-injection of fuel may further take place during the expansion stroke. As also described herein, in some instances, the first cylinder group is not utilized for power generation, therefore the injection of fuel into the first cylinder group is, in this sense, deactivated.

Referring to engine output, FIG. 3 further shows that it is possible for two cylinders of the four-cylinder engine, for instance, cylinders 1 and 3, to be operated in the exhaust heating mode and so not substantially contribute to the power generation within the engine while the other cylinders, (e.g., cylinders 2 and 4), are operated in the normal mode and thereby generate power. As described herein, when the engine operates with one or more deactivated cylinders, the amount of fuel injected into the power generating cylinders (e.g., cylinders 2 and 4) may be further adjusted to maintain an engine output, for example, by increasing the torque generated by said cylinders in response to the deactivation of cylinders 1 and 3. As such, the fuel injection within the first cylinder group is deactivated while the second cylinder group is operated in the normal mode to generate power therein. A corresponding adjustment to the fuel injection within the second cylinder group thereby maintain the torque or engine output that corresponds to the power output by the engine as if the first cylinder group was also operated in the normal mode. In this way, it is possible to avoid less efficient partial-load operations within the second cylinder group.

Although the first embodiment illustrates that the power strokes with the second cylinder group comprise a significant contribution to the power generation of the engine while the first cylinder group operates in an exhaust heating mode, the method further includes operating the first cylinder group with a compression and/or a power stroke injection. Therefore, further embodiments are described wherein the first cylinder group also contributes power to a small degree during the engine drive cycle.

Figure 4:
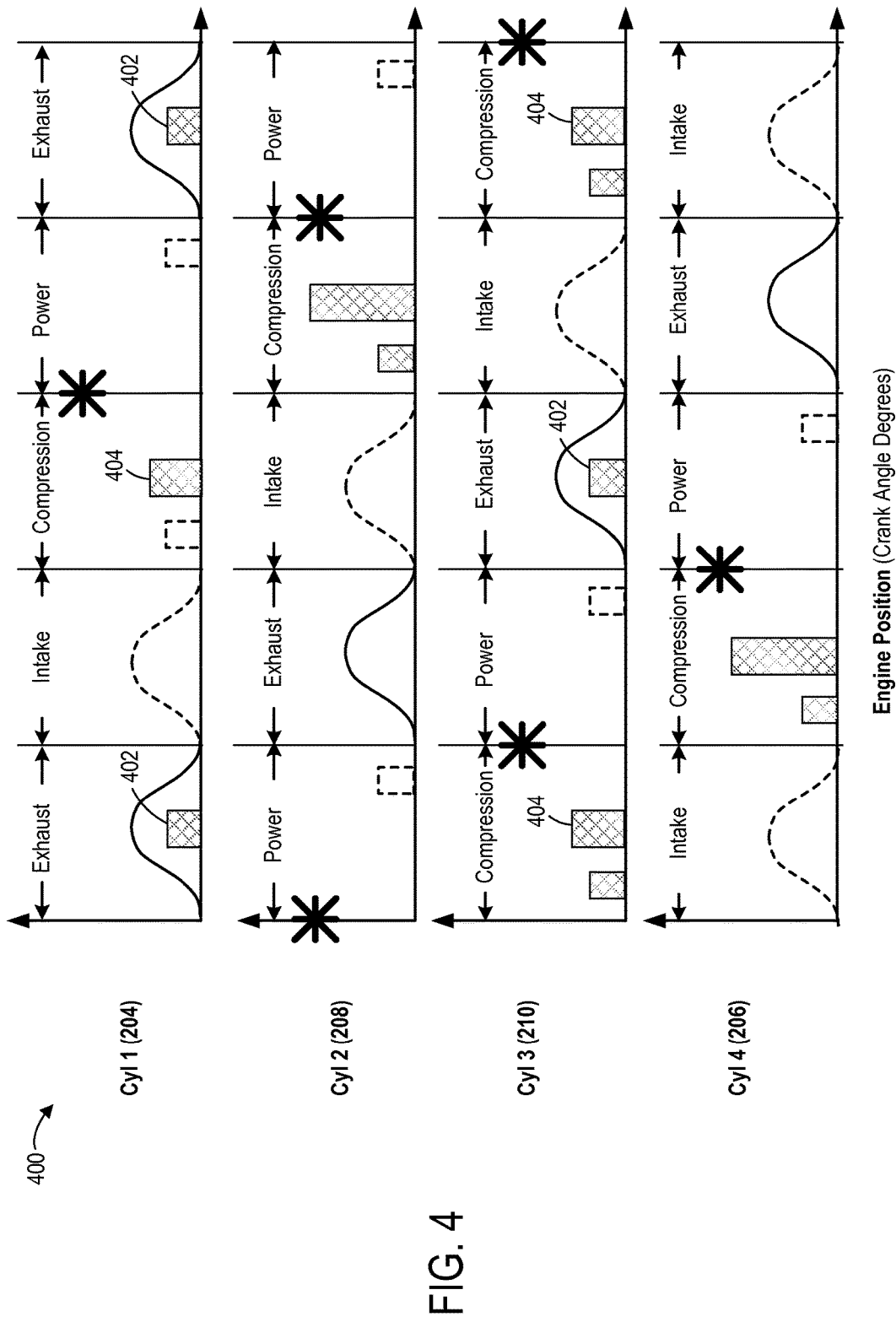
FIG. 4 shows an example map of valve timing and piston position for a second embodiment according to the present disclosure.

Referring to FIG. 4, which shows example map 400 that corresponds to a second embodiment according to the present disclosure wherein the deactivated cylinders also contribute power to a small degree during the engine drive cycle, for instance, based on an engine output greater than a power threshold. Although the first embodiment describes non-overlapping injections wherein the first cylinder group (e.g., cylinders 1 and 3) both inject fuel during their respective exhaust strokes while the second cylinder group (e.g., cylinders 2 and 4) operate in the power generating mode by injecting fuel during a compression stroke, in general, the methods herein further include performing a compression stroke injection within the first group of cylinders. Because fuel is injected via a common fuel rail and the method also includes an exhaust stroke injection, the compression stroke injection and exhaust stroke injection occur concurrently herein, the first group of cylinders may therefore increase the power generated for driving the vehicle. As such, the amount of fuel injected to the first cylinder group during the exhaust stroke may be reduced based on the engine speed and load. In general, when the exhaust stroke injection and compression stroke injection occur in the same engine stroke, one or the other of the exhaust stroke injection and compression stroke injections is greater than the threshold indicating 50% of maximum fuel injection.

In FIG. 4, the second embodiment shows cylinders 1 and 3 of the first cylinder group both undergoing partial injections during an exhaust stroke while the other piston within the group (e.g., cylinders 3 and 1, respectively) performs a compression stroke injection (e.g., third compression stroke injection). Thereby, during each stroke of the engine, work may be performed while the exhaust system is heated. Such a situation may arise, for instance, when a cold vehicle operates at a higher engine load such that the power generated by the first group of cylinders increases the total power generated therein. In this way, main exhaust stroke injection 402 within the first group of cylinders is reduced compared to exhaust stroke injections 302 of FIG. 3, wherein no simultaneous compression stroke injections occur. As such, the method includes operating the four in-line cylinders with a common rail injection in a second mode, wherein the method includes operating the first cylinder group with a third, larger, compression stroke injection, and with a second, smaller, exhaust stroke injection while operating the second cylinder group with at least a fourth compression stroke injection based on the engine operating conditions. Although the second mode includes operating the first cylinder group with a larger compression stroke injection and a smaller exhaust stroke injection, this is non-limiting, and in some instances, the exhaust stroke injection may be larger than the compression stroke injection, for example, in response to an exhaust stroke injection greater than the injection threshold. When the engine operates in either the first or second operating modes as described herein, the compression stroke injection within the second cylinder group (e.g., fourth compression stroke injection) is generally greater than the threshold since the second cylinder group provides substantially all of the power for driving the vehicle while one or more cylinders are deactivated. As noted above, because fuel is injected via a common fuel rail, compression stroke injection 404 may also be reduced (e.g., below the threshold), and is herein shown reduced compared to main injection 232 of FIG. 2. Thereby, the engine described may further adjust fuel injections in a manner that heats the exhaust system while also adjusting the amount of power generated therefrom.

Figure 5:
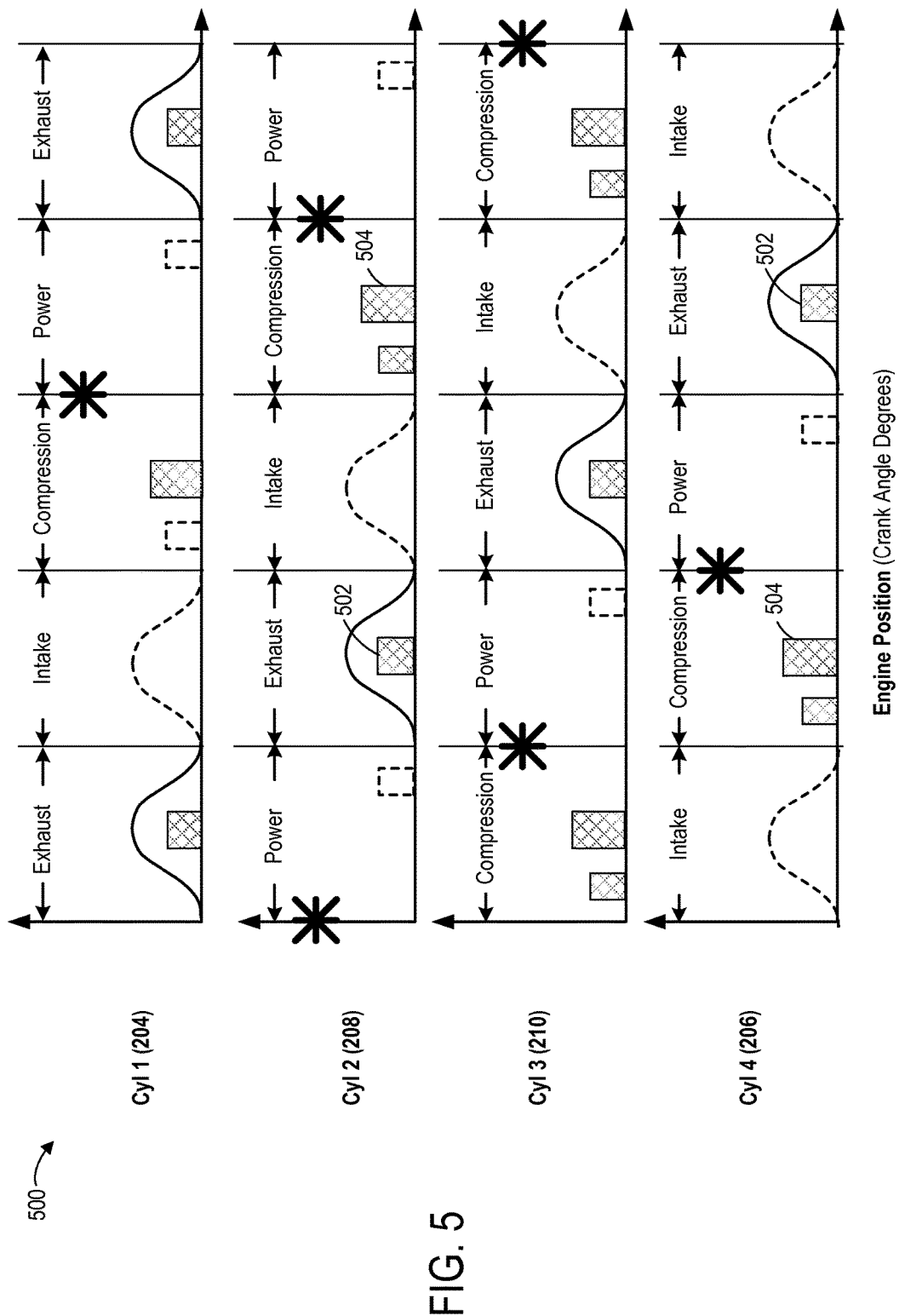
FIG. 5 is an example map of valve timing and piston position for a third embodiment according to the present disclosure.

In FIG. 5, example map 500 shows a third embodiment, wherein the first group of cylinders includes all of the cylinders of engine 10. For example, engine 10 may operate at a lower load while the exhaust system is heated up, for instance, because the vehicle has just been started on a cold day (e.g., temperature below freezing). As described herein, the third embodiment shows an engine system that adjusts injections to the first cylinder group, wherein the first cylinder group includes all four cylinders of the engine. As shown herein, in some instances, the methods described may therefore adjust injections to all of the cylinders based on the engine operating conditions. FIG. 5 shows exhaust stroke injection 502 within the previously described second cylinder group (e.g., cylinders 2 and 4) also operating to heat the exhaust system while producing power in the manner described above with respect to the first cylinder group of FIG. 4. The system herein thus includes automatically adjusting the amount of fuel injected during compression stroke injection 504 of cylinders 2 and 4 in addition to cylinders 1 and 3. As such, when cylinder 2 is in an exhaust stroke, cylinder 4 may generate power via a compression stroke injection and vice-versa. In this way, the optimum operation of the exhaust-gas aftertreatment device of the internal combustion engine is made possible while the least possible intervention is made into the operation and power generation of the internal combustion engine.

Turning to control of the methods, FIG. 6 shows an example flow chart for adjusting engine operations based on an exhaust gas temperature and engine operating conditions. As described, in one embodiment, method 600 may be a set of programmable instructions for making adjustments and carrying out the methods described that are stored into memory of controller 12.

At 602, method 600 includes monitoring engine conditions. In one example, monitoring engine conditions includes detecting an exhaust gas temperature (e.g., via temperature sensor 126) that is further used for deciding when the exhaust system is to be heated through exhaust stroke fuel injections to one or more cylinders. In another example, temperature sensor 126 may be omitted from exhaust passage 48, but the exhaust gas temperature therein may still be estimated based on a model based on other engine information detected by one or more of the sensors described (e.g., based on an engine temperature).

At 604 method 600 includes determining whether the exhaust gas operation of emission control system 70 is optimally occurring for the engine conditions detected. In some instances, controller 12 may be programmed to determine whether optimal exhaust gas operation is occurring by comparing a detected exhaust temperature (e.g., $T_{EXHAUST}$) to an exhaust temperature threshold ($T_{THRESHOLD}$). Based on this comparison, controller 12 may further make adjustments within engine 10 to change a cylinder fuel injection. For example, if controller 12 determines that $T_{EXHAUST}$ is too low for the operating conditions, controller 12 may adjust a fuel injection to one or more cylinders in the manner already described so an exhaust stroke injection occurs to thereby provide heat to the exhaust system.

In response to a low exhaust temperature, at 606, method 600 includes increasing $T_{EXHAUST}$ by operating a first cylinder group with an exhaust stroke injection while operating a second cylinder group with at least a compression stroke injection based on the engine output. For example, in the first embodiment shown in FIG. 3, controller 12 adjusted a main fuel injection to the first cylinder group comprising the odd-numbered cylinders while the second cylinder group comprising the even-numbered cylinders generated power via a compression stroke injection above a threshold. Therefore, the method generally includes determining how many cylinders operate within the first cylinder group and thus how many operate within the second cylinder group. The first cylinder group may include at least one cylinder but in some instances, the first cylinder group may include all of the engine cylinders (e.g., as described in FIG. 5). As described herein, exhaust stroke injections may take place for a number of strokes or for a time period that depends on the enrichment of the exhaust gas required for the operation of the exhaust-gas aftertreatment device based on the power demands of the engine (e.g., engine output). Alternatively, if the exhaust gas device operation is substantially optimal for the engine conditions detected, at 608 engine 10 may continue operating the engine while making no further adjustments therein.

Returning to the differential fuel injection described with respect to box 606, wherein the engine system operates with at least a partial exhaust stroke fuel injection to a first cylinder group while a compression stroke fuel injection is made to a second cylinder group, method 600 further includes adjusting a fuel injection based on the engine speed and load. As such, at box 610, method 600 includes comparing an engine output to a power threshold in order to determine whether one or more of the first cylinder group is to operate for power generation by injecting fuel within at least a compression stroke of the engine drive cycle.

Therefore, at 612, method 600 includes operating the first cylinder group with a larger compression stroke injection and a smaller exhaust stroke injection to generate power within the first cylinder group. For example, FIG. 4 shows one embodiment wherein controller 12 partially injected a small amount of fuel to cylinder 1 while also partially injecting fuel to cylinder 3 that was used to generate power. In this way, engine 10 was able to generate a sufficient power to meet an output demanded by the vehicle operator (e.g., as determined by pedal position sensor 134). Alternatively or additionally, in some instances, engine 10 may further increase the power delivered by the second cylinder group by increasing the amount of fuel injected therein while the first cylinder group operates in the exhaust heating mode. If no extra engine power is to be generated based on the current operating conditions of the vehicle, for example because engine output is below the power threshold, at 616 engine 10 may continue making exhaust stroke fuel injections to the first cylinder group as illustrated herein.

With regard to the length of time, or duration in which the engine operates in the exhaust heating mode, at 614, method 600 includes monitoring an injection rate to one or more cylinders during operation. Therefore, if a high injection rate (e.g., greater than an injection threshold) is to be delivered to one or more cylinders (e.g., because the difference between $T_{EXHAUST}$ and $T_{THRESHOLD}$ is large), controller 12 may automatically determine that the first cylinder group is to include all cylinders and thereby make fuel injection adjustments in order to increase the exhaust system heating rate. Alternatively, controller 12 may determine that the first cylinder group (e.g., the odd-numbered cylinders) are to be operated in the exhaust heating mode while the second cylinder group (e.g., the even-numbered cylinders) is operated in a power generating mode. In some instances, engine 10 may maintain an engine output while heating the exhaust system, however, in other instances the engine power may be reduced accordingly to accommodate the exhaust heating operations. However, according to the present disclosure, optimum operation of the exhaust-gas aftertreatment device of the internal combustion engine is made possible, wherein at the same time the least possible intervention is made into the operation and the power generation of the internal combustion engine. At 614, if the fuel injection rate falls below the injection threshold, the engine may continue operating with differential fuel injection but continue making compression stroke injection responsive to the exhaust stroke injections.

Turning to the fuel injection, FIG. 7 shows an example schematic cylinder injection profile to illustrate how a main injection may be adjusted based on the engine operating conditions. Although pre-, main-, and post-injections were described above, in general, the timing, pulse width and rate of injection may be adjusted within an engine stroke. As such, FIG. 7 schematically represents stroke duration 702 along with an injection profile comprising pre-injection 710 and main-injection 712. With regard to main-injection 712 that is shown having an adjustable pulse width 720 and injection rate 722, in the example shown, these two injection features may be relied upon to vary the amount of fuel delivered to one or more cylinders. Although not shown, the timing relative to the stroke duration itself may also be adjusted by, for instance, providing main-injection 712 earlier or later during stroke duration 702.

FIG. 8 further shows an example injection profile for two cylinders (e.g., the odd-numbered cylinders) to illustrate one method by which an engine may adjust an amount of fuel injected during one or more exhaust strokes of the engine over a number of cycles (e.g., cycles 802, 804, and 806) in order to heat the exhaust system. As shown, controller 12 may determine that engine 10 is to heat the exhaust system and thereby make adjustments for exhaust stroke injection 810 concurrently with compression stroke injection 812. If the amount of fuel delivered to cylinder 1 is low compared to injection threshold 814, controller 12 may further determine that simultaneous injections therein are to occur. Otherwise, as shown for second engine cycle 804, controller 12 may reduce the amount of fuel delivered to cylinder 3 during the compression stroke responsive to the increased amount of fuel delivered to cylinder 1. Thereby, during second cycle 804, which occurs after first cycle 802, exhaust injection 820 within cylinder 1 may be higher relative to exhaust stroke injection 810, although both are still below injection threshold 814. As such, compression stroke injection 822 within cylinder 3 may be further reduced but still generate mechanical power to a small degree for driving the vehicle. In third cycle 806 that occurs after each of the first two strokes, and wherein exhaust injection 830 is greater than injection threshold 814, controller 12 may further reduce compression injection 832 to cylinder 3, and in some instances, substantially prevent the compression stroke fuel injection responsive to the high injection rate.

In this way, optimum operation of the exhaust-gas aftertreatment device of the internal combustion engine is made possible, wherein at the same time the least possible intervention is made into the operation and the power generation of the internal combustion engine. Furthermore, the operation of a fuel direct injection device designed as a common rail system can be enhanced in the manner described above.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating four in-line cylinders with common rail injection, comprising:
in a first mode, operating a first cylinder group of two cylinders without compression and power stroke injections and with an exhaust stroke injection, while operating a second cylinder group of two cylinders with at least a compression stroke injection, and no ignition event takes place in the first cylinder group during operation in the first mode, and during the operation in the first mode, no fuel injections to the first cylinder group and the second cylinder group overlap.

2. The method of claim 1, wherein each of the exhaust and compression stroke injections have a fuel quantity that exceeds a threshold.

3. The method of claim 2, wherein the compression stroke injection of the second cylinder group further includes multiple injections comprising a pre-injection and a main-injection, and the pre-injection comprises an injection of fuel in a quantity that is less than the threshold.

4. The method of claim 3, wherein the exhaust stroke injections occur based on one of an exhaust temperature and an engine output.

5. A method for operating four in-line cylinders with common rail injection, comprising:
in a first mode that includes an engine output being less than a power threshold, operating a first cylinder group without a compression stroke injection and with a first exhaust stroke injection while operating a second cylinder group with at least a first compression stroke injection; and
in a second mode that includes the engine output increasing above the power threshold, operating the first cylinder group with a second compression stroke injection and a second exhaust stroke injection while operating the second cylinder group with at least a third compression stroke injection, where a first quantity of fuel injected by the first exhaust stroke injection is greater than a second quantity of fuel injected by the second exhaust stroke injection.

6. The method of claim 5, wherein the method further includes, in a third mode, operating all four in-line cylinders with a fourth compression stroke injection and no exhaust stroke injection.

7. The method of claim 5, wherein, in the second mode, at least one compression stroke injection in the second cylinder group and at least one exhaust stroke injection in the first cylinder group occur concurrently.

8. The method of claim 5, wherein during both the first and the second mode, an exhaust gas temperature is below a temperature threshold.

9. The method of claim 5, wherein the first cylinder group comprises a first cylinder and a third cylinder and the second cylinder group comprises a second cylinder and a fourth cylinder in an engine firing order, and wherein operating the first cylinder group with the second compression stroke injection and the second exhaust stroke injection while operating the second cylinder group with at least the third compression stroke injection further comprises operating the first cylinder with a compression stroke injection, concurrently to operating the third cylinder with an exhaust stroke injection, operating the second cylinder without an intake stroke injection, and operating the fourth cylinder without a power stroke injection; and
operating the second cylinder with a compression stroke injection, concurrently to operating the fourth cylinder without an exhaust stroke injection, operating the first cylinder without a power stroke injection, and operating the third cylinder without an intake stroke injection.

10. The method of claim 6, further comprising, during a fourth mode, operating all four in-line cylinders with a fifth compression stroke injection and a third exhaust stroke injection.

11. A method for operating an engine with a common fuel rail, comprising:

directly injecting a first amount of fuel to each cylinder of a first cylinder group during a respective exhaust stroke while injecting a second amount of fuel to each cylinder of a second cylinder group during a respective compression stroke and not injecting fuel to each cylinder of the second cylinder group during a respective exhaust stroke of the second cylinder group, and also injecting a third amount of fuel to one or more cylinders of the first cylinder group during a compression stroke of the one or more cylinders, wherein the third amount is based on the first amount, and wherein the third amount is smaller than the second amount.

12. The method of claim 11, further comprising post-injecting fuel to the one or more cylinders of the first cylinder group during a power stroke of the one or more cylinders.

13. The method of claim 11, wherein directly injecting the first amount of fuel to each cylinder of the first cylinder group during the respective exhaust stroke comprises directly injecting the first amount of fuel to each cylinder of the first cylinder group in a respective exhaust stroke over a number of exhaust strokes of the first cylinder group while an exhaust temperature is below a temperature threshold.

14. The method of claim 11, wherein the engine comprises an even number of cylinders, wherein the even number of cylinders further includes at least four cylinders that are fired in an engine firing order, wherein the first cylinder group comprises all odd-numbered cylinders of the engine firing order and the second cylinder group comprises all even-numbered cylinders of the engine firing order, and wherein:

directly injecting the first amount of fuel to each cylinder of the first cylinder group during the respective exhaust stroke comprises directly injecting a main injection of fuel into each odd-numbered cylinder only during an exhaust stroke, where the main injection of fuel into each odd-numbered cylinder comprises a largest amount of fuel injected into each odd-numbered cylinder in a given cylinder cycle, and injecting the second amount of fuel to each cylinder of the second cylinder group during the respective compression stroke comprises injecting a main injection of fuel into each even-numbered cylinder during a compression stroke, where the main injection of fuel into each even-numbered cylinder comprises a largest amount of fuel injected into each even-numbered cylinder in a given cylinder cycle.

15. The method of claim 14, wherein the main injections are non-overlapping injections that are delivered to one cylinder at a time.

16. The method of claim 11, wherein the first cylinder group comprises a first cylinder and a third cylinder and the second cylinder group comprises a second cylinder and a fourth cylinder, wherein when the second cylinder is in an exhaust stroke, the fourth cylinder generates power via a compression stroke injection, and when the fourth cylinder is in an exhaust stroke, the second cylinder generates power via a compression stroke injection.

* * * * *